US006740851B2

(12) United States Patent
Woodlief et al.

(10) Patent No.: US 6,740,851 B2
(45) Date of Patent: May 25, 2004

(54) QUICK CONNECT HOT MELT UNIT

(75) Inventors: Robert J. Woodlief, Suwanee, GA (US); David F. Bullock, Monterey, CA (US)

(73) Assignee: Nordson Corporation, Westlake, OH (US)

( * ) Notice: Subject to any disclaimer, the term of this patent is extended or adjusted under 35 U.S.C. 154(b) by 88 days.

(21) Appl. No.: 10/256,884

(22) Filed: Sep. 27, 2002

(65) Prior Publication Data

US 2004/0060918 A1 Apr. 1, 2004

(51) Int. Cl.[7] .......................... F16M 1/00; F16M 9/00; F16M 11/00; F27B 14/00

(52) U.S. Cl. ....................... 219/421; 222/180; 248/678; 248/680; 248/681; 248/346.5

(58) Field of Search ....................... 219/421; 222/146.5, 222/180; 248/678, 680, 681, 346.04, 346.5

(56) References Cited

U.S. PATENT DOCUMENTS

| | | | | | |
|---|---|---|---|---|---|
| 3,212,739 | A | * | 10/1965 | Morris | 248/681 |
| 3,429,543 | A | * | 2/1969 | Mooney | 248/346.04 |
| 3,493,201 | A | * | 2/1970 | Marran | 248/678 |
| 3,531,023 | A | | 9/1970 | Mercer | 222/146 |
| 3,981,416 | A | | 9/1976 | Scholl | 222/146 |
| 4,308,447 | A | | 12/1981 | Notzold et al. | 219/421 |
| 4,474,311 | A | | 10/1984 | Petrecca | 222/146.5 |
| 4,667,850 | A | | 5/1987 | Scholl et al. | 222/23 |
| 4,747,570 | A | * | 5/1988 | Takahashi | 248/309.1 |
| 4,771,920 | A | | 9/1988 | Boccagno et al. | 222/146.5 |
| 4,850,425 | A | | 7/1989 | Anderson | 165/65 |
| 5,657,904 | A | | 8/1997 | Frates et al. | 222/146.5 |
| 6,029,940 | A | * | 2/2000 | Klein | 248/346.04 |
| 6,175,101 | B1 | | 1/2001 | Miller et al. | 219/422 |
| 6,427,966 | B1 | * | 8/2002 | Blumenschein | 248/678 |
| 6,478,284 | B2 | * | 11/2002 | Qiu | 248/680 |

* cited by examiner

*Primary Examiner*—Joseph Pelham
(74) *Attorney, Agent, or Firm*—Wood, Herron & Evans, L.L.P.

(57) ABSTRACT

A device for removably attaching a dispensing unit of a hot melt adhesive system to a support surface. The device generally includes a mounting plate having a mounting surface that is capable of being secured to a support surface, one or more engaging members, and one or more coupling members. The engaging and coupling members may be flanges extending outwardly from the mounting surface. The engaging and coupling members are arranged about the mounting surface for securing a base of the dispensing unit to the mounting plate after the device is secured to the support surface. The dispensing unit includes securing members that releasably couple with the engaging members to provide a secure interconnection with the mounting plate.

19 Claims, 4 Drawing Sheets

QUICK CONNECT HOT MELT UNIT

BACKGROUND OF THE INVENTION

Hot melt adhesives are dispensed by dispensing systems having one or more dispensing guns coupled by heated hoses to a melter, which is sometimes referred to as a dispensing unit. The melter may include a tank for melting the hot melt adhesive, a manifold having multiple distribution outlets for coupling with a heated hose, and a pump for transferring the hot melt adhesive from the tank through the manifold. Adhesive material is supplied to the tank in solid or semi-solid form, where it is melted and heated by a heater to a desired temperature.

Conventional dispensing units for hot melt adhesive dispensing systems, as described above, are typically mounted to a structural member, such as a planar table top of a bench or a frame of the machine with which the dispensing system is associated. The dispensing unit usually has a base and may include downwardly-extending supports, such as flanges, feet or legs, that project from the underside of the base. The supports may be affixed to the table top or frame. The table top or frame required that holes be machined in the table top or frame that coincided with the positions of clearance holes in the support. After the dispensing unit is positioned such that the clearance holes are aligned with the holes in the table top or frame, bolts or other fasteners are used to finish the mounting procedure.

SUMMARY OF THE INVENTION

Once a mounting device is mounted to a support surface, the dispensing unit is mounted to the mounting device. According to the principles of the invention and in one embodiment, the mounting device includes a mounting plate configured to be mounted to the support surface. The mounting plate includes a first edge and a second edge spaced longitudinally from the first edge. The mounting plate further includes at least one coupling member adjacent to the edge and at least one engaging member adjacent to the first edge. The engaging member and coupling member cooperate to secure the hot melt adhesive dispensing unit with the mounting plate so that the base portion has a contacting relationship with the mounting plate. The engaging member is releasably engageable by the corresponding securing element for selectively securing the hot melt dispensing unit against movement relative to the mounting plate and the support surface.

In another embodiment of the invention, the mounting device has a mounting plate with a planar surface and a pair of spaced-apart side flanges extending outwardly from the planar surface. The mounting plate is configured to be mounted to the support surface. The side flanges have a spaced relationship sufficient to receive therebetween the dispensing unit on the planar surface. The base of the dispensing unit is then releasably securable with the side flanges.

The invention is further directed to a method for releasably attaching a dispensing unit to a support surface. The method may include detachably fastening a mounting plate to the support surface and subsequently securing the dispensing unit to the mounting plate so that the dispensing unit is secured against movement relative to the mounting plate.

The elimination of conventional support features may operate to reduce the effective height of the dispensing unit. This may result in the dispensing unit being more compact. In one embodiment, the sub-base of the invention simplifies installation of a dispensing unit because the sub-base can be easily manipulated for attachment to the support surface and, thereafter, the bulkier and heavier dispensing unit is coupled with the sub-base.

These and other advantages of the invention will become more readily apparent to those of ordinary skill in the art upon review of the following detailed description of the preferred embodiments, taken in conjunction with the accompanying drawing.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain details of the preferred embodiments.

DETAILED DESCRIPTION

The invention is directed to mounting devices for mounting a dispensing unit or melter to a support surface. Although the invention will be described next in connection with certain embodiments, the invention is not limited to practice in any one specific type of dispensing unit.

Figure 1:
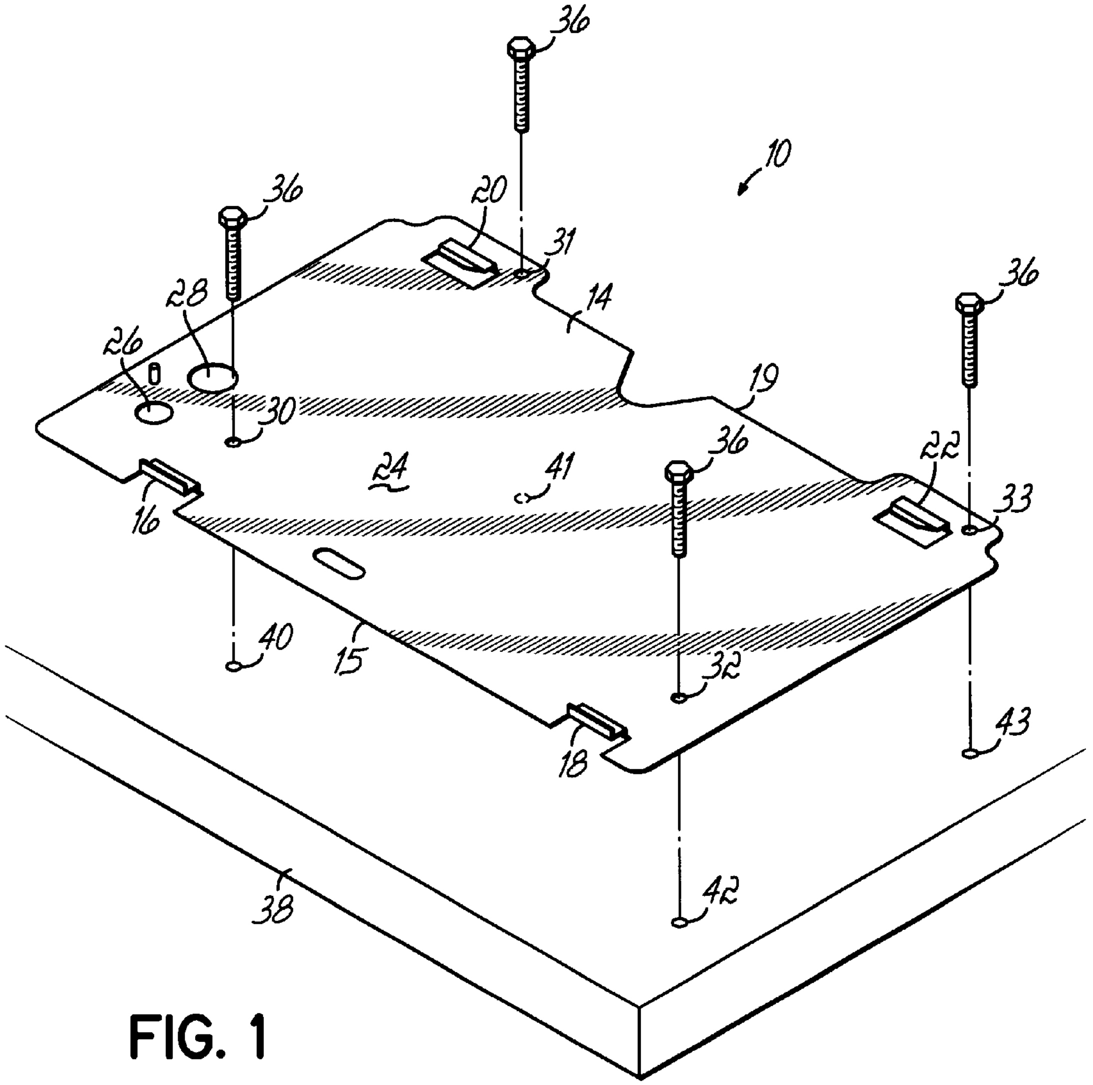
FIG. 1 is a perspective view of a sub-base for a dispensing unit of a hot melt adhesive system incorporating the principles of the invention.

With reference to FIG. 1 and in accordance with the principles of the invention, a sub-base 10 configured to releasably couple with a melter or hot melt adhesive dispensing unit 12 (FIG. 2) includes a generally rectangular mounting plate 14 having an edge 15 and an opposite edge 19 spaced with a longitudinal relationship relative to edge 15. Provided adjacent to edge 15 of the mounting plate 14 is a transversely-spaced pair of engaging members or flanges 16, 18. Provided adjacent to edge 19 of the mounting plate 14 is a pair of coupling members or flanges 20, 22 that have a transversely-spaced relationship. Each of the flanges 16, 18, 20, 22 is raised above a generally planar upper surface 24 of the sub-base 10 and projects generally toward edge 15. Typically, the sub-base 10 is formed from a sheet of any suitable material, such as a cold rolled steel, in which the flanges 16,18, 20, 22 are provided by, for example, a punching operation. Sub-base 10 may alternatively be constructed from a mounting plate 14 formed from a thermoplastic or thermoset resin with flanges 16, 18, 20, 22 made from a metal and molded into the mounting plate 14. The set of flanges 16,18, 20, 22 is configured for releasably or detachably coupling the sub-base 10 with the dispensing unit 12.

Dispensing unit 12 may be any suitable dispensing unit or melter operative to provide a flow of viscous liquid, such as hot melt adhesive. Hot melt dispensing units suitable for use in the invention include the Series 3000 melters available commercially from Nordson Corporation (Westlake, Ohio). In addition, hot melt adhesive dispensing units suitable for use in the invention are disclosed in, for example, commonly-assigned U.S. Pat. No. 5,919,384 (Reifenberger et al.) and U.S. Pat. No. 6,433,315 (Reifenberger et al.), each of which is hereby incorporated by reference herein in its entirety.

The rectangular mounting plate 14 includes a pair of disk-shaped openings 26, 28 through which, for example, cables for electrical service or cables from a controller can be routed to the dispensing unit 12. The openings 26, 28 permit the cables to be readily accessible for coupling with the dispensing unit 12 (FIG. 2) during the mounting sequence that secures the unit 12 with the sub-base 10. The openings 26, 28 may be provided with conventional strain release mechanisms (not shown). Routing the cables through the openings 26, 28 also facilitates replacement of a malfunctioning dispensing unit 12 with a functioning dispensing unit 12. This is especially important if the cables are routed to the openings 26, 28 through rigid conduit because the conduit does not have to be disconnected to change the dispensing units 12.

With continued reference to FIG. 1, a plurality of, for example, four mounting holes 30, 31, 32, 33 extend through the rectangular mounting plate 14 between a lower surface 34 (FIG. 4) and an upper surface 24. Each of the mounting holes 30–33, illustrated as clearance holes, is dimensioned to receive a corresponding one of a plurality of fasteners 36 for securing the sub-base 10 to the support surface 38, which may be a planar table top. The mounting holes 30–33 are arranged in a pattern that provides reliable securement, such as being provided adjacent to the corners of the mounting plate 14. Provided in the support surface 38 are complementary mounting holes 40, 41, 42, 43 arranged to be registered in vertical alignment with mounting holes 30–33. Preferably, the machining operation forming mounting holes 30–33 also forms mounting holes 40–43 for simplifying the mounting procedure.

Figure 2:
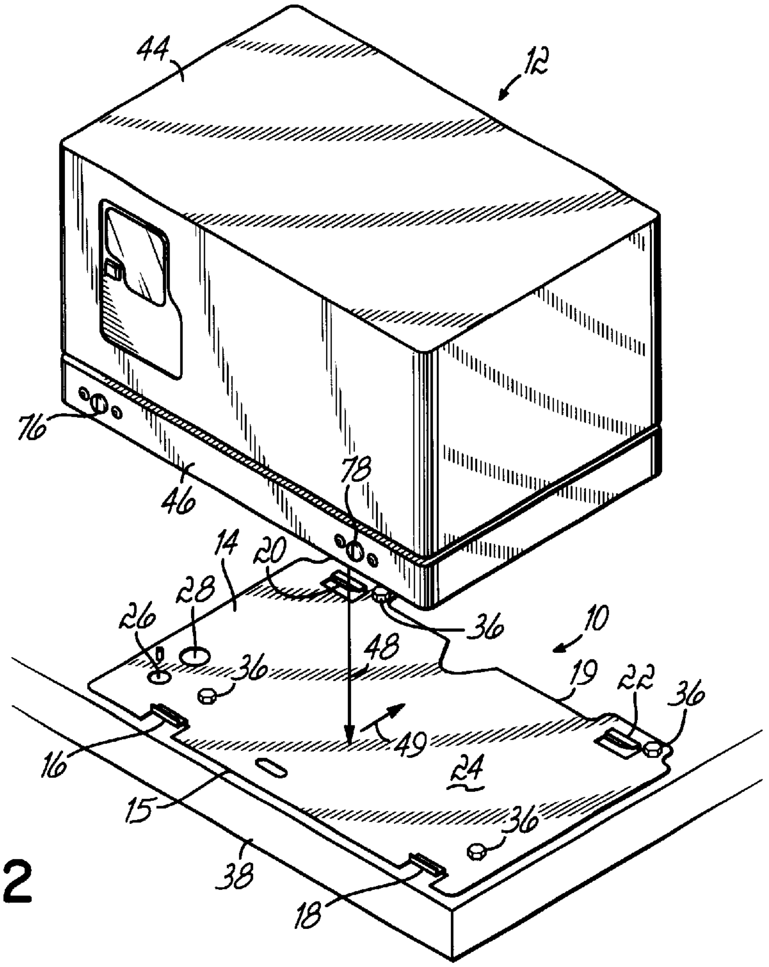
FIG. 2 is a perspective view illustrating the sub-base of the invention with the dispensing unit removed.
Figure 3:
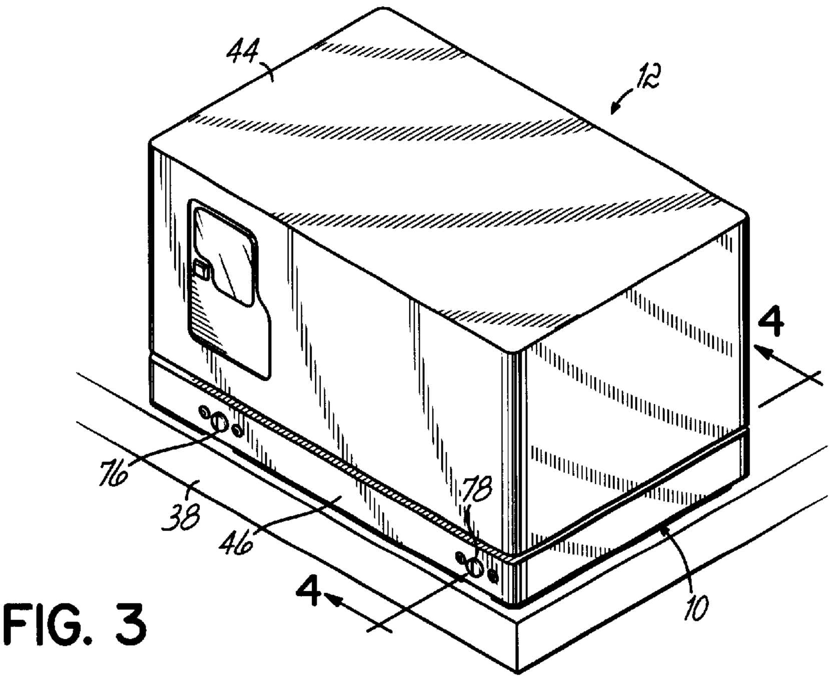
FIG. 3 is a perspective view similar to FIG. 2 in which the dispensing unit is mounted to the sub-base of the invention.

With reference to FIGS. 2 and 3, the dispensing unit 12 includes a chassis 44 having a base portion 46 configured to be removably coupled or otherwise interconnected with the sub-base 10 after the sub-base 10 is secured to the support surface 38. Specifically, the dispensing unit 12 is moved vertically, in the general direction of arrow 48, so as to rest in an unsecured position at least partially contacting the upper surface 24 of the rectangular mounting plate 14. The dispensing unit 12 is then moved rearwardly, in the general direction of arrow 49, to position the dispensing unit 12 in a securable position, as shown in FIG. 3.

Figure 4:
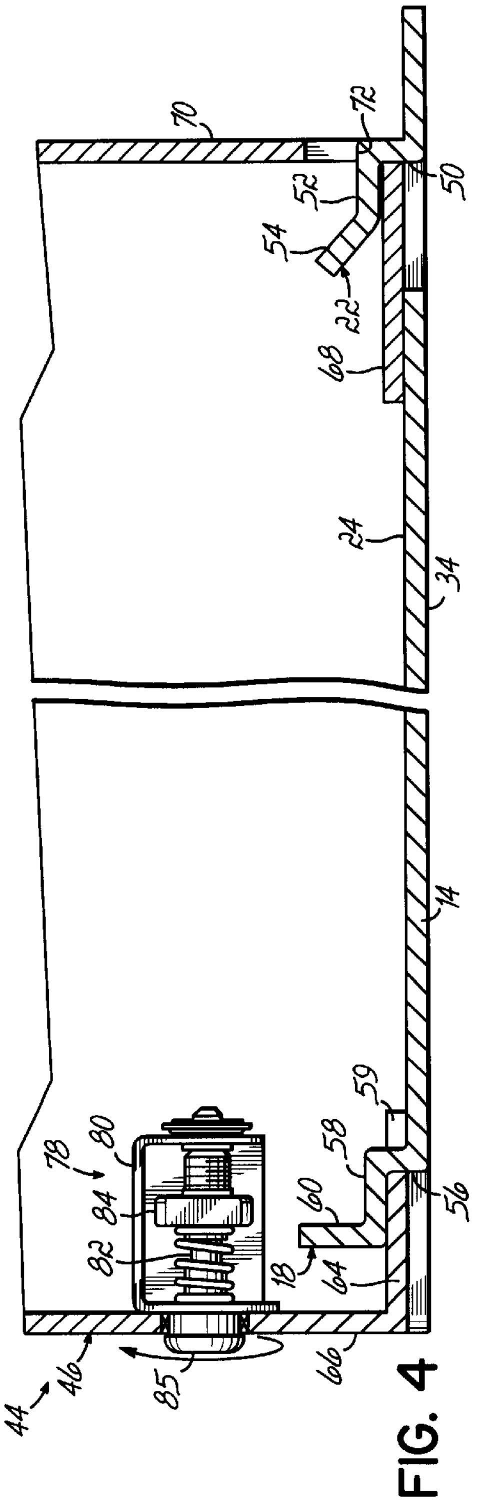
FIG. 4 is a cross-section view taken generally along lines 4—4 in FIG. 3 in which latch assemblies coupling the dispensing unit with the sub-base are unlatched.
Figure 5:
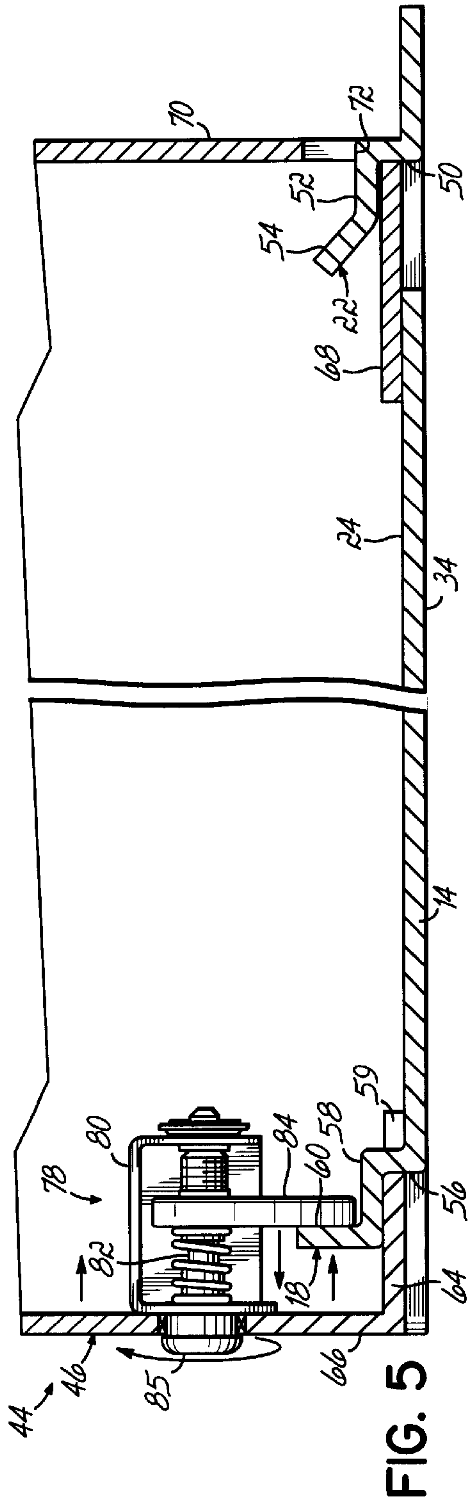
FIG. 5 is a cross-section view similar to FIG. 4 in which latch assemblies coupling the dispensing unit with the sub-base are latched.

With continued reference to FIGS. 2, 4 and 5, flanges 20, 22 generally have a similar construction so that the following discussion of flange 22 is equally applicable to flange 20. Flange 22 includes a vertical leg 50 joined by an angled bend with the rectangular mounting plate 14, a forwardly-extending horizontal leg 52 joined by an angled bend with the vertical leg 50, and an inclined free end 54 depending upwardly at an acute angle from the horizontal leg 52. The vertical leg 50 extends outwardly from the plane of the upper surface 24 at approximately a right angle. The horizontal leg 52 is substantially orthogonal to the vertical leg 50 and, therefore, lies in a plane substantially parallel to the plane of the upper surface 24. In one embodiment, the inclined free end 54 is inclined at an angle of about 45° relative to the horizontal leg 52.

Flanges 16, 18 generally have a similar construction so that the following discussion of flange 18 is equally applicable to flange 16. Flange 18 includes a relatively-short vertical leg 56 joined by an angled bend with mounting plate 14, a forwardly-extending horizontal leg 58 joined by an angled bend with the vertical leg 56, and a vertical leg 60 joined by an angled bend with the horizontal leg 58. The vertical leg 56 extends outwardly from the plane of the upper surface 24 at approximately a right angle. The horizontal leg 58 is substantially orthogonal to the vertical leg 56 and, therefore, lies in a plane substantially parallel to the plane of the upper surface 24. The vertical leg 60 extends outwardly perpendicular to the horizontal leg 58 and substantially parallel to the vertical leg 56.

With reference to FIGS. 4 and 5, the base portion 46 of chassis 44 includes a vertical wall 66, a lip 64 projecting inwardly from vertical wall 66, a vertical wall 70 opposite to vertical wall 66, and a lip 68 projecting inwardly from vertical wall 70. A portion of lip 64 is captured beneath the horizontal leg 58 of each of the flanges 16,18 at least when the dispensing unit 12 is in the secured and securable positions. Each of the flanges 16, 18 is positioned in one of a pair of notches 59 formed in lip 64, of which one side edge of one of the notches 59 is shown in FIGS. 4 and 5. The vertical wall 70 includes a pair of slotted openings 72, of which one slotted opening 72 is shown, spaced with a transverse relationship to coincide with the transverse spacing between the flanges 20, 22 so that flanges 20, 22 may be coupled with lip 68. The inclined free ends 54 of flanges 20, 22 operate as guides for the lip 68 as the chassis 44 is moved from the unsecured position to the securable position. Respective portions of the lip 68 are secured between the horizontal leg 52 of each flange 20, 22 and the upper surface 24 of the rectangular mounting plate 14.

The engagement between each of the flanges 20, 22 and the corresponding one of slotted openings 72 and between each of the flanges 16, 18 and the side edges of the corresponding one of notches 59 limit side-to-side movement of chassis 44. The vertical legs 56 of flanges 16, 18 and the vertical legs 50 of flanges 20, 22 also operate as stops contacting vertical walls 66, 70, respectively, to limit rearward movement of the chassis 44 in the securable and secured positions. To that end, the vertical leg 60 of each of the flanges 16,18 is positioned, when the dispensing unit 12 is in the securable position, for being engaged by a corresponding one of a spaced-apart pair of securing members 76, 78, of which securing member 78 is visible in FIGS. 4 and 5, to provide the secured position.

With reference to FIGS. 2, 4 and 5, the securing members 76, 78 may be any device capable of coupling and, typically, detachably or releasably coupling with, or otherwise engaging, the flanges 16,18 when the dispensing unit 12 is in the securable position. In the illustrated embodiment, the securing members 76, 78 have a similar construction so that the following discussion of securing member 78 is equally applicable to securing member 76. Securing member 78 is operative, along with securing member 76, for providing the secured position of the dispensing unit 12 following positioning in the securable position, such as by moving the chassis 44 from the securable position (FIG. 4) to the secured position (FIG. 5). Securing member 78 includes a support bracket 80 attached to the wall 66 of the base portion 46, a spring-biased shaft 82 rotatably coupled with the support bracket 80, and a pawl or latching finger 84 attached to the shaft 82. An end portion of the shaft 82 extends through the wall 66 to a position in which a head 85 of the shaft 82 is accessible from the exterior of the chassis 44. A suitably-shaped tool is engaged with a toolhead recess in the head 85 for angularly rotating or turning the shaft 82.

The securing members 76, 78 are individually actuated by rotation to perform two sequential functions to provide the secured position of the dispensing unit 12. The shaft 82 is rotated through an arc to swing the latching finger 84 first into a position behind the vertical leg 60 of the flange 18, which operates as a keeper. Continued rotation of the shaft 82 then draws the latching finger 84 towards the vertical wall 66 such that the engagement between the vertical leg 60 and latching finger 84 moves the chassis 44 toward the edge 15 of the sub-base 10. The procedure is reversed to return the chassis 44 to the securable position. In the securable and unsecured positions, the latching finger 84 has an angular position that provides a non-contacting relationship with the corresponding one of the flanges 16,18 so that the dispensing unit 12 is movable between the securable and unsecured positions.

Securing members 76, 78 may be, for example, any compression, pull-up or draw latch assembly capable of releasably coupling or securing the sub-base 10 and the dispensing unit 12. Exemplary compression latch assemblies suitable for use in the invention are available commercially, for example, from Southco, Inc. (Concordville, Pa.). It is contemplated by an alternative embodiment of the invention that the sub-base 10 may be equipped with one securing member and that the base portion 46 of chassis 44 may include a single engaging member configured to couple with the securing member. In addition, it is contemplated by the invention that the sub-base 10, in an alternative embodiment, may include a single coupling member.

In use, the sub-base 10 is positioned relative to the support surface 38 such that the lower surface 34 of mounting plate 24 has a contacting relationship with support surface 38. After a suitable location is selected, the mounting holes 30–33 are registered with mounting holes 40–43 and fasteners 36 are used to attach the mounting plate 24 to support surface 38. The mounting holes 30–33 may be formed at the point of attachment and, in addition, the mounting holes 40–43 in the mounting plate 24 may be formed by the machining operation forming holes 30–33. To establish the securable position, the chassis 44 of dispensing unit 12 is moved so that the base portion 46 contacts with upper surface 24 and the lip 68 is secured with the flanges 20, 22 and the lip is secured with the flanges 16, 18. The latch assemblies 76, 78 are individually actuated to engage flanges 16, 18 for moving the chassis 44 of the dispensing unit 12 from the securable position to the secured position.

Figure 6:
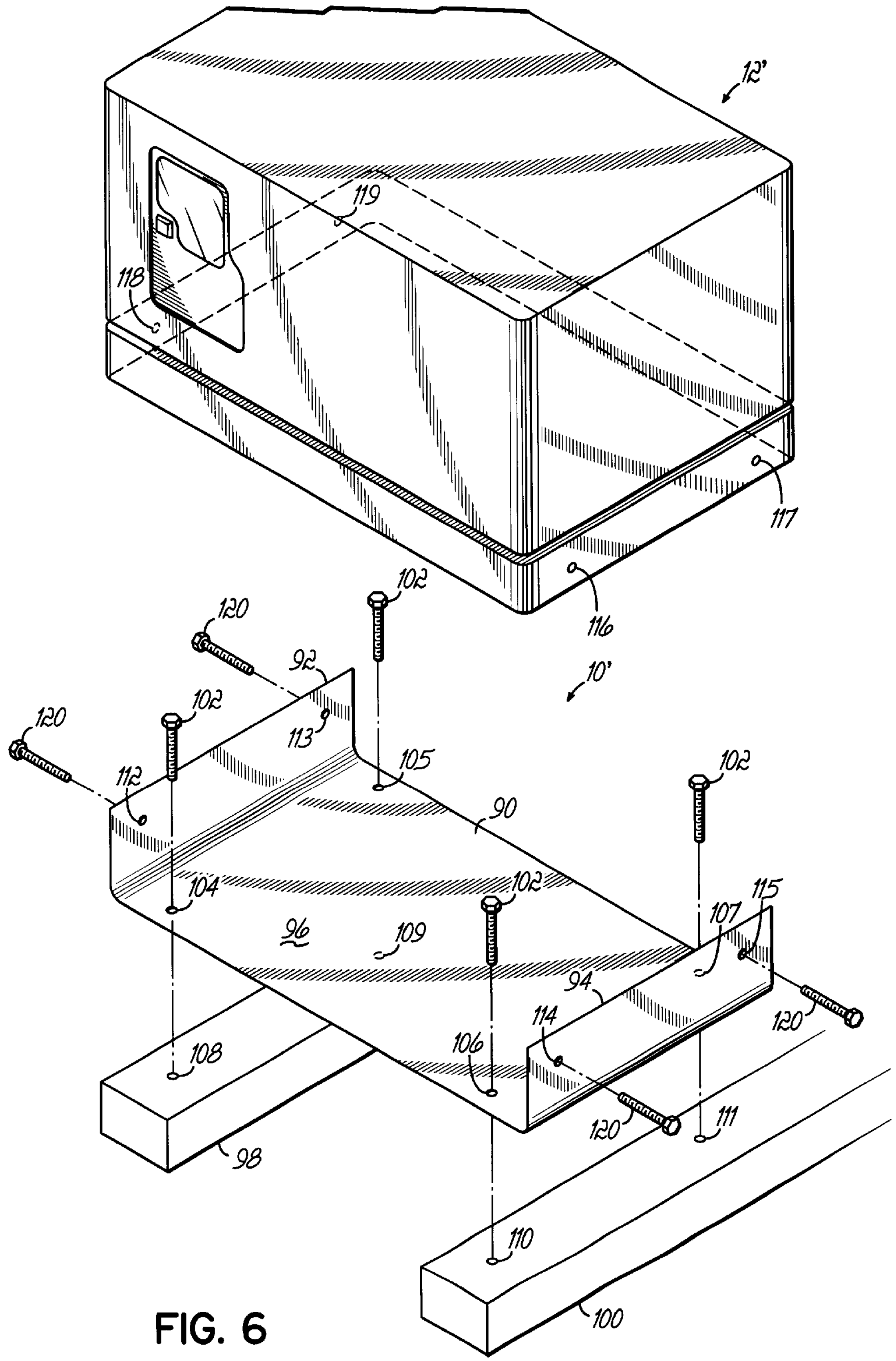
FIG. 6 is a perspective view of an alternative embodiment of a sub-base incorporating the principles of the invention.

With reference to FIG. 6 and in an alternative embodiment of the invention, a detachable sub-base 10' consists of a substantially rectangular mounting plate 90 and an opposed pair of substantially parallel flanges 92, 94 depending or projecting outwardly at an angle from opposite side edges of the rectangular mounting plate 90. Typically, each of the flanges 92, 94 is substantially orthogonal to an upper planar surface 96 of the mounting plate 90, although the invention is not so limited. Flanges 92, 94 are spaced apart by a distance sufficient to receive a dispensing unit 12' that is similar to dispensing unit 12 (FIGS. 3 and 4). It is contemplated by the invention that the flanges 92, 94 may project outwardly from the mounting plate 90 from locations other than the opposite side edges so long as dispensing unit 12 is positionable between flanges 92, 94. The mounting plate 90 and flanges 92, 94 are typically formed as a single-piece structure by conventional metalworking techniques such that each of the flanges 92, 94 is smoothly joined by a radiused or curved bend with the mounting plate 90. Alternatively, the flanges 92, 94 may be separate components assembled with the mounting plate 90 to construct the sub-base 10'.

The sub-base 10' may be mounted to another piece of equipment, which may include a pair of parallel, spaced-apart frame members 98, 100 with a plurality of conventional fasteners 102. To that end, a plurality of, for example, four mounting holes 104, 105, 106, 107 is provided in the rectangular mounting plate 90 with a pattern of locations suitable for coupling the sub-base 10' with the frame members 98, 100. Typically, the mounting holes 104–107 are provided in the mounting plate 90 immediately before plate 90 is mounted to the frame members 98, 100. A plurality of complementary mounting holes 108, 109, 110, 111 are provided in the frame members 98, 100 and, typically, are formed concurrently with the mounting holes 104–107 in the mounting plate 90 such that mounting holes 108–111 are registered with mounting holes 104–107. The pattern of mounting holes 104–107 in the mounting plate 90 may be tailored to conform to the relative arrangement and positioning of the frame members 98, 100. The complementary mounting holes 108–111 may be either throughholes or threaded holes. It is contemplated by the invention that the sub-base 10' could be mounted to a planar table or bench top rather than the illustrated frame members 98, 100.

Flange 92 further includes a spaced-apart pair of mounting holes 112, 113 and flange 94 further includes a spaced-apart pair of mounting holes 114, 115 used to couple the dispensing unit 12' with the sub-base 10'. The dispensing unit 12' includes complementary mounting holes 116-119 that are positioned so as to register with the mounting holes 112–115 in the flanges 92, 94 when the dispensing unit 12' is positioned in the space between the flanges 92, 94 and in a contacting relationship with upper surface 96. Conventional fasteners 120 are provided for coupling the dispensing unit 12' with the sub-base 10'.

In use, the sub-base 10' is positioned relative to the frame members 98, 100, or other support surface, such that a bottom surface or underside of the mounting plate 90 has a contacting relationship with the frame members 98, 100. After a suitable location is selected, the mounting holes 104–107 are created in the mounting plate 90. The mounting holes 108–111 in the frame members 98, 100 are typically formed concurrently with mounting holes 104–107. Fasteners 102 are received in the mounting holes 104–107, 108–111 and are used to mechanically secure the sub-base 10' with frame members 98, 100. The dispensing unit 12' is moved to a position in the open space between the flanges 92, 94 and into a contacting relationship with the upper surface 96 such that the mounting holes 116–119 are registered with the mounting holes 112–115 in the flanges 92, 94. Fasteners 120 are used to couple the sub-base 10' and dispensing unit 12'.

While the present invention has been illustrated by the description of various embodiments thereof, and while the embodiments have been described in considerable detail, it is not intended to restrict or in any way limit the scope of the appended claims to such detail. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of applicant's general inventive concept.

What is claimed is:

1. A device for securing a hot melt adhesive dispensing unit to a support surface, the hot melt adhesive dispensing unit having a base portion with at least one securing element, said device comprising:

a mounting plate configured to be mounted to the support surface, said mounting plate having a first edge and a second edge spaced longitudinally from said first edge;

at least one coupling member adjacent to said first edge; and at least one engaging member adjacent to said second edge, said at least one engaging member and said at least one coupling member cooperating to secure the hot melt adhesive dispensing unit with said mounting plate so that the base portion has a contacting relationship with said mounting plate, said at least one engaging member being releasably engageable by the at least one securing element for selectively securing the hot melt dispensing unit against movement relative to said mounting plate.

2. The device of claim 1 wherein said mounting plate includes a generally planar surface extending between said first and said second edges, said planar surface contacting the base portion, and said at least one coupling member comprises a flange projecting outwardly from said planar surface and away from the support surface when said mounting plate is mounted to the support surface.

3. The device of claim 2 wherein said flange includes a horizontal leg extending substantially parallel to said planar surface, said horizontal leg being operative to capture the base portion between said horizontal leg and said planar surface.

4. The device of claim 2 wherein said flange further includes an inclined lip angled away from said planar surface at an acute angle, said inclined lip operating to guide the portion of the base portion between said horizontal leg and said planar surface when the hot melt adhesive dispensing unit is coupled with said mounting plate.

5. The device of claim 1 wherein said at least one engaging member includes a keeper capable of being engaged by the securing member of the hot melt dispensing unit.

6. The device of claim 1 wherein said mounting plate includes a generally planar surface positioned between said first and said second edges, and said at least one engaging member comprises a flange projecting outwardly from said planar surface and away from the support surface when said mounting plate is mounted to the support surface.

7. The device of claim 6 wherein said flange includes a horizontal leg extending substantially parallel to said planar surface, said horizontal leg operating to capture the base portion between said horizontal leg and said planar surface.

8. The device of claim 1 wherein said mounting plate includes a plurality of mounting holes arranged in a pattern capable of being registered with a complementary pattern of mounting holes provided in the support surface.

9. The device of claim 1 further comprising a dispensing unit operative to provide a flow of hot melt adhesive, said dispensing unit having a base portion with at least one securing member configured for releasable engagement with said at least one engaging member.

10. The device of claim 9 wherein said at least one engaging member includes a keeper capable of being engaged by said at least one securing member.

11. The device of claim 9 wherein said at least one securing members are selected from the group consisting of compression latches, pull-up latches, and draw latch assemblies.

12. A device for mounting a dispensing unit to a support surface, the dispensing unit having a base portion, said device comprising:

a mounting plate having a planar surface and a pair of spaced-apart flanges extending outwardly from said planar surface, said mounting plate configured to be mounted to the support surface, said flanges having a spaced relationship sufficient to receive therebetween the dispensing unit on said planar surface, and said flanges being releasably securable with the base portion of the dispensing unit.

13. The device of claim 12 wherein said flanges are substantially perpendicular to said planar surface.

14. The device of claim 12 wherein said mounting plate includes a plurality of mounting holes arranged in a pattern for registering with a complementary pattern of mounting holes provided in the support surface.

15. The device of claim 12 further comprising a dispensing unit operative to provide a flow of hot melt adhesive, said dispensing unit having a base portion configured to be releasably secured with the flanges.

16. A method for attaching a dispensing unit for heated liquids to a support surface, comprising:

fastening a mounting plate to the support surface; and subsequently securing the dispensing unit releasably with the mounting plate so that the dispensing unit is fixed against movement relative to the mounting plate.

17. The method of claim 16 wherein the fastening step includes:

forming a plurality of first mounting holes in the mounting plate; and forming a plurality of second mounting holes in the support surface in locations capable of being registered with the first mounting holes for securing the mounting plate to the support surface.

18. The method of claim 17 wherein the plurality of first mounting holes is formed by the same forming operation as the plurality of second mounting holes.

19. The method of claim 16 wherein the mounting plate is detachably fastened to the support surface.

* * * * *